（12） United States Patent
Ryu

(10) Patent No.: US 11,654,967 B2
(45) Date of Patent: May 23, 2023

(54) STEERING SHOCK ABSORBING STRUCTURE FOR IN-WHEEL MOTOR AND METHOD THEREOF

(71) Applicants: Hyundai Motor Company, Seoul (KR); Kia Corporation, Seoul (KR)

(72) Inventor: Sang Woock Ryu, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/543,181

(22) Filed: Dec. 6, 2021

(65) Prior Publication Data

US 2022/0306200 A1    Sep. 29, 2022

(30) Foreign Application Priority Data

Mar. 29, 2021   (KR) ................. 10-2021-0040071

(51) Int. Cl.
| | |
|---|---|
| *B62D 17/00* | (2006.01) |
| *B60G 7/00* | (2006.01) |
| *B60G 17/016* | (2006.01) |
| *B60G 3/26* | (2006.01) |
| *B60G 15/06* | (2006.01) |

(52) U.S. Cl.
CPC ............... *B62D 17/00* (2013.01); *B60G 3/26* (2013.01); *B60G 7/006* (2013.01); *B60G 15/068* (2013.01); *B60G 17/016* (2013.01); *B60G 2200/462* (2013.01); *B60G 2200/464* (2013.01); *B60G 2202/42* (2013.01); *B60G 2202/43* (2013.01); *B60G 2204/128* (2013.01); *B60G 2206/1116* (2013.01)

(58) Field of Classification Search
CPC .......... B62D 17/00; B60G 3/26; B60G 7/006; B60G 15/068; B60G 17/016; B60G 2200/462; B60G 2200/464; B60G 2202/42; B60G 2202/43
See application file for complete search history.

(56) References Cited

U.S. PATENT DOCUMENTS

| | | | | |
|---|---|---|---|---|
| 8,746,383 B2* | 6/2014 | Basadzishvili | .......... | B60G 3/01 280/124.1 |
| 2006/0012144 A1* | 1/2006 | Kunzler | .................. | B60G 3/01 280/124.125 |
| 2007/0080509 A1* | 4/2007 | Kim | .................. | B60G 17/0162 280/5.522 |

(Continued)

FOREIGN PATENT DOCUMENTS

| | | |
|---|---|---|
| CN | 106828597 A | 6/2017 |
| CN | 109649098 A | 4/2019 |

(Continued)

*Primary Examiner* — Paul N Dickson
*Assistant Examiner* — Tiffany L Webb
(74) *Attorney, Agent, or Firm* — Fox Rothschild LLP

(57) ABSTRACT

A steering shock absorbing structure for an in-wheel motor includes: a steering input unit configured to detect a steering angle of a steering wheel; a steering unit fastened to the steering input unit, and configured to steer a wheel according to the steering angle of the steering input unit; a tilting unit having a first end connected to the steering unit and a second end connected to the wheel, and configured to be tilted with respect to the steering unit; and a controller configured to selectively drive the tilting unit.

14 Claims, 7 Drawing Sheets

(56) References Cited

U.S. PATENT DOCUMENTS

| | | | |
|---|---|---|---|
| 2007/0131474 A1* | 6/2007 | Zetterstroem | B62D 17/00 |
| | | | 280/124.135 |
| 2010/0078910 A1* | 4/2010 | Mueller | B62D 9/00 |
| | | | 280/93.503 |
| 2018/0201319 A1* | 7/2018 | Rogers | B60G 3/26 |
| 2020/0079167 A1* | 3/2020 | Brenner | B62D 7/18 |
| 2020/0122771 A1* | 4/2020 | Ooba | B62D 7/18 |
| 2021/0009193 A1* | 1/2021 | Ooba | B62D 17/00 |
| 2021/0122228 A1* | 4/2021 | Son | B60K 7/0007 |
| 2021/0155290 A1* | 5/2021 | Chen | B62D 9/04 |
| 2021/0197887 A1* | 7/2021 | Ohata | B62D 7/146 |
| 2021/0394610 A1* | 12/2021 | Kim | B60G 11/16 |

FOREIGN PATENT DOCUMENTS

| | | | | |
|---|---|---|---|---|
| JP | 2007-118766 A | 5/2007 | | |
| JP | 2020-505270 A | 2/2020 | | |
| KR | 200345375 Y1 | 3/2004 | | |
| KR | 101964373 B1 | 4/2019 | | |
| WO | WO-2007026199 A1 * | 3/2007 | ............... | B60G 3/14 |

\* cited by examiner

[ NORMAL DRIVING STATE ]

[ SSA OPERATION STATE DURING ROAD SURFACE IMPACT ]

STEERING SHOCK ABSORBING STRUCTURE FOR IN-WHEEL MOTOR AND METHOD THEREOF

CROSS REFERENCE TO RELATED APPLICATION

The present application claims under 35 U.S.C. § 119(a) the benefit of Korean Patent Application No. 10-2021-0040071, filed Mar. 29, 2021, the entire contents of which are incorporated by reference herein.

BACKGROUND

(a) Technical Field

The present disclosure relates to a steering shock absorbing structure for an in-wheel motor and a steering shock absorbing method for an in-wheel motor, more preferably, to the steering shock absorbing structure capable of minimizing damage to the in-wheel motor by applying a separate tilting unit that secondarily absorbs a shock that is equal to or higher than a preset threshold, and the steering shock absorbing method capable of selectively driving the tilting unit by calculating an amount of impact detected by a plurality of sensors.

(b) Description of the Related Art

In general, a vehicle is driven by transferring force to a road surface with tires, in which a moving direction of the vehicle is controlled by moving front wheels or rear wheels through a steering device operated by a driver on a driver's seat. Since a large amount of power is used in order to rotate a steering wheel used as the steering device, instead of operating the steering wheel manually, a power steering system that uses forces of an electric motor and hydraulic pressure as auxiliary power is used. A motor drive power steering (MDPS) system includes an electric motor connected to a shaft of the steering wheel, and may easily rotate the steering wheel by using a torque provided from the electric motor as an auxiliary torque.

When the driver rotates the steering wheel, however, a pinion of a steering gear rotates by the same angle at that of the steering wheel, the rotation is changed into reciprocation by a helical gear, and a steering angle of the tire is then determined. As such, since a mechanism from the steering wheel to the steering gear is fixed in a solid type, when a hardware specification is determined, steering responsiveness in the vehicle is also determined.

As described above, responsiveness of the steering wheel may not be efficiently changed in response to a driving speed of the vehicle, driving tendency of the driver, or the like, so that it is difficult to meet requirements of a particular driver, and optimized responsiveness may not be realized in various driving conditions.

Recently, an in-wheel motor vehicle has been provided in which a motor is directly embedded in a rim part of a wheel for mounting a tire to directly transfer power of the motor to the wheel, which includes advantages in that a power train in an intermediate stage such as a decelerator or a differential gear may be omitted to reduce a weight of the vehicle and energy loss in a power transfer process is reduced.

Using the in-wheel motor vehicle that is driven by electricity instead of gasoline has an advantage in an environmental aspect, but the in-wheel motor vehicle also has an advantage in that left and right wheels thereof may move independently due to the structural aspect. In an in-wheel motor system, a steering motor mounted in each wheel replaces an existing steering gear structure, so that a freedom of movement of the vehicle is increased. Further, a structure of a steering system of an autonomous-driving vehicle is constructed. However, there is a risk of safety issues as mechanical components are replaced by electrical components, which are vulnerable to external impacts.

In particular, in an independently controlled steering system for an in-wheel motor, motors performing a steering function are utilized at each front wheel. Therefore, freely controlling a toe angle during bump/rebound and freely controlling an inner/outer wheel angle during turning, which were difficult to realize due to mechanical constraints, are realized, so that higher degrees of freedom may be realized in implementing a desired driving performance.

However, as the mechanical constraints between the wheels and the steering system are removed, there is a difficulty of withstanding an impact load by using an operating force of a motor, in which the impact load was supported by the rigidity of the structure itself, such as a steering gear. If a significant impact is transferred from the road surface, the impact load may exceed a limit of the operating force of the motor, and the steering angle of each wheel is instantly changed to an angle that is difficult to control, so that a risk of accident occurs.

In addition, the drive motor inside the wheel may be damaged by the impact, resulting in an inoperable state of the drive motor. This can cause a safety problem due to the loss of steering control function by the road impacts. Therefore, a steering shock absorber (SSA) capable of securing a stability of a driving while the in-wheel motor is applied is needed.

SUMMARY

Accordingly, the present disclosure provides a steering shock absorbing structure for an in-wheel motor, the structure being capable of minimizing damage to an in-wheel motor by applying a separate tilting unit that secondarily absorbs a shock that is equal to or higher than a preset threshold.

In addition, the present disclosure provides a steering shock absorbing method for an in-wheel motor, the method capable of selectively driving a tilting unit by calculating an amount of impact detected by a plurality of sensors.

Objectives of the present disclosure are not limited to the above-described objectives, and other objectives of the present disclosure, which are not mentioned, can be understood by the following description and also will be apparently understood through embodiments of the present disclosure. Further, the objectives of the present disclosure can be implemented as described in the appended claims and a combination thereof.

A steering shock absorbing structure for an in-wheel motor for achieving the above-described objectives of the present disclosure includes the following configuration.

According to an embodiment of the present disclosure, there is provided a steering shock absorbing structure for an in-wheel motor, the structure including: a steering input unit configured to detect a steering angle of a steering wheel; a steering unit fastened to the steering input unit, and configured to steer a wheel according to the steering angle of the steering input unit; a tilting unit having a first end connected to the steering unit and a second end connected to the wheel, and configured to be tilted with respect to the steering unit; and a controller configured to selectively drive the tilting unit.

In addition, the steering unit may include: a steering motor connected to the steering input unit and configured to rotate the tilting unit; and a steering angle sensor connected to the steering motor with respect to a steering shaft, and configured to detect whether the steering angle that is input into the steering input unit and a rotation angle of the steering motor match each other.

In addition, the tilting unit may include: a tilting yoke having an end fastened to the steering unit; a tilting unit housing fixed to the wheel, and configured to be rotationally tilted with respect to a tilting shaft positioned at a surface of the tilting yoke; a tilting braking device positioned between the tilting unit housing and the tilting yoke, and configured to selectively fix the tilting unit housing; a tilting shock absorber having a first end connected to the tilting yoke and a second end connected to the tilting unit housing; and a tilting angle sensor operably connected with the tilting braking device, and configured to detect a tilting angle of the tilting unit housing.

In addition, the steering shock absorbing structure may further include: an acceleration sensor configured to detect an impact value of a vehicle, wherein when the impact value that is equal to or higher than a preset impact value is applied to the acceleration sensor, a steering angle sensor detects whether the steering angle that is input into the steering input unit and a rotation angle of a steering motor match each other.

In addition, when the vehicle is in a driver controllable state, the controller may control the tilting braking device to fix the tilting unit housing.

In addition, when the vehicle is in a driver non-controllable state, the controller may control the tilting braking device to release the tilting unit housing.

In addition, the tilting unit housing may be configured to be tilted with respect to the tilting yoke, and the tilting shock absorber may be configured to be compressed.

In addition, when the vehicle escapes from the driver non-controllable state, the tilting unit housing may be returned to an original position thereof by an elastic restoring force of the tilting shock absorber.

In addition, the tilting unit housing may be configured to be released from tilting, and the tilting braking device may be configured to be fixed.

In addition, the steering shock absorbing structure may further include: an in-wheel motor unit connected to the tilting unit and configured to independently apply a driving force to the wheel.

In addition, according to another embodiment of the present disclosure, there is provided a steering shock absorbing method for an in-wheel motor, the method including steps of: detecting, by an acceleration sensor, whether an impact value that is equal to or higher than a preset impact value is applied to the acceleration sensor; when the impact value that is equal to or higher than the preset value is applied to the acceleration sensor, determining, by a controller, whether a vehicle is in a driver controllable state; in the determining step, when the controller determines the vehicle is in a driver non-controllable state, releasing a tilting braking device; detecting, by a tilting angle sensor, whether a tilting unit housing is tilted within a preset tilting limit angle; when the tilting unit housing is tilted within the preset tilting limit angle, adjusting, by the controller, a steering angle that is input into a steering input unit and a rotation angle of a steering motor to match each other under a condition that the tilting braking device is released; when the adjusting step is completed, detecting, by the tilting angle sensor, whether the tilting unit housing is returned to an original position thereof; and when the tilting angle sensor detects that the tilting unit housing is restored to the original position thereof, fixing the tilting braking device.

In addition, the determining step may further include: determining whether the steering angle that is input and the rotation angle of the steering motor are the same; when the steering angle and the rotation angle are not the same, determining whether a torque that is currently applied from the steering motor is equal to or less than a preset limit torque of the steering motor; and detemiining that the vehicle is in the driver controllable state when the torque that is currently applied from the steering motor is equal to or less than the preset limit torque of the steering motor, and determining that the vehicle is in the driver non-controllable state when the torque that is currently applied from the steering motor exceeds the preset limit torque of the steering motor.

In addition, the determining step may further include: adjusting, by the controller, the steering angle that is input into the steering input unit and the rotation angle of the steering motor to match each other.

In addition, the detecting step may further include: when the tilting unit housing is tilted away from the preset tilting limit angle, fixing the tilting braking device; adjusting, by the controller, the steering angle that is input into the steering input unit and the rotation angle of the steering motor to match each other; when the adjusting step is completed, releasing the tilting braking device; detecting, by the tilting angle sensor, whether the tilting unit housing is returned to the original position thereof; and when the tilting unit housing is returned to the original position thereof, fixing the tilting braking device.

The present disclosure may obtain the following effects by the aforementioned exemplary embodiments and the configuration, combination, and use relationship to be described later.

Minimizing damage to the in-wheel motor may be realized by the tilting shock absorber that secondarily absorbs a shock transferred from a road surface.

In addition, the controller calculates the amount of impact and selectively drives a tilting unit, so that the driving stability may be secured in a normal driving condition, and when an impact value that is equal to or higher than a preset impact value is applied, both front and rear/up and down impacts may be efficiently absorbed, so that an effect of preventing damage to the in-wheel motor is realized.

BRIEF DESCRIPTION OF THE DRAWINGS

The above and other objectives, features, and other advantages of the present disclosure will be more clearly understood from the following detailed description when taken in conjunction with the accompanying drawings, in which.

DESCRIPTION OF THE PREFERRED EMBODIMENTS

Figure 1:
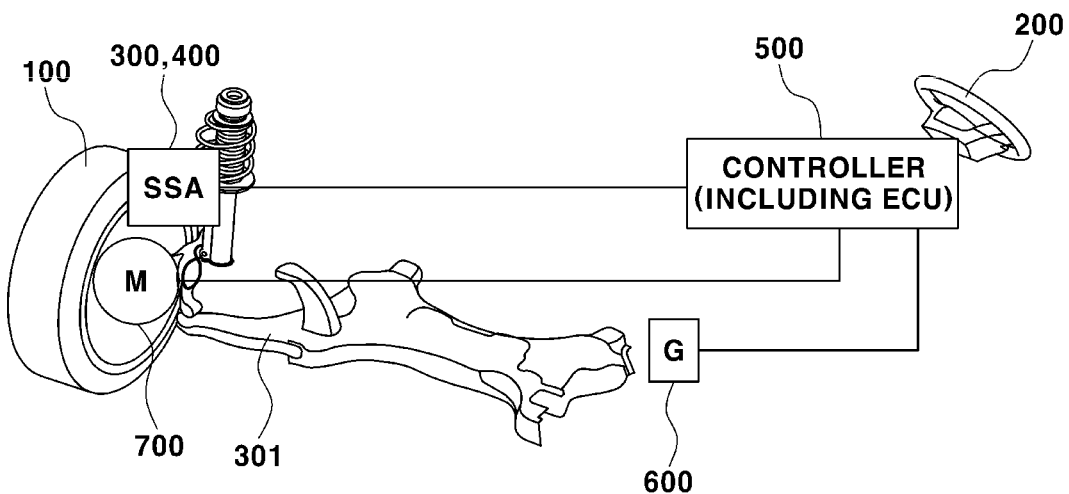
FIG. 1 is a view illustrating a configuration of a steering shock absorbing structure for an in-wheel motor, according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings. The embodiments of the present disclosure can be modified in various forms, and the scope of the present disclosure should not be construed as being limited to the following embodiments. These embodiments are provided to more fully describe the present disclosure to those skilled in the art.

In the disclosure, it will also be understood that when an element is referred to as being "on" or "above" another element, it can be directly on the other element or intervening elements may also be present. Likewise, in the disclosure, it will also be understood that when an element is referred to as being "under" or "beneath" another element, it can be directly on the other element or intervening elements may also be present.

Reference numerals used in operations are provided for convenience of description, without describing the order of the operations, and the operations can be executed in a different order from the stated order unless a specific order is definitely specified in the context.

Figure 2:
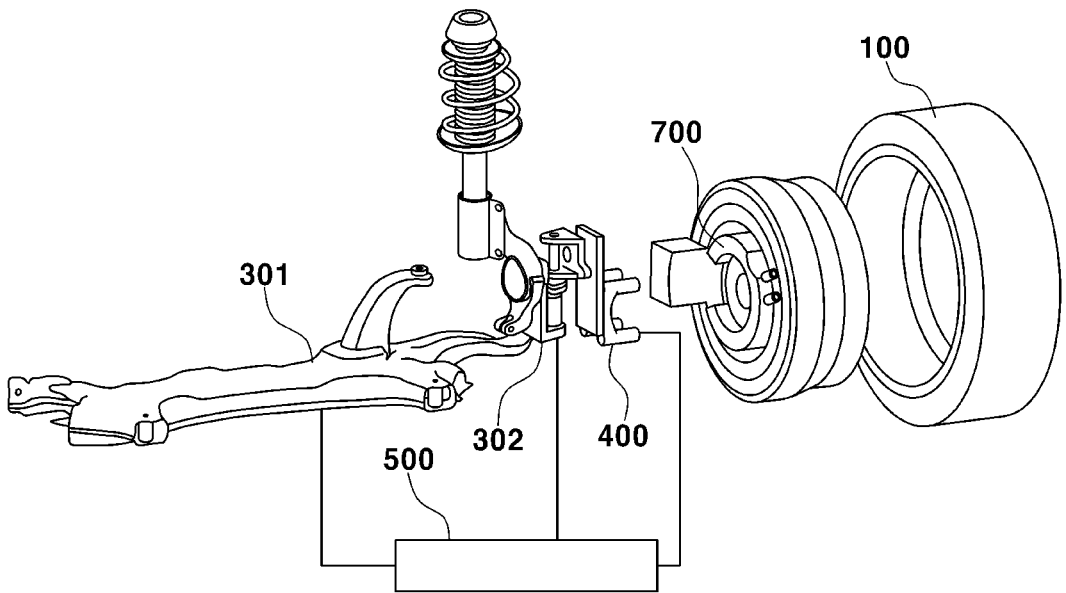
FIG. 2 is an overall perspective view illustrating the steering shock absorbing structure for an in-wheel motor, according to an embodiment of the present disclosure.

FIG. 1 is a view illustrating a configuration of a steering shock absorbing structure for an in-wheel motor, according to an embodiment of the present disclosure. FIG. 2 is an overall perspective view illustrating the steering shock absorbing structure for an in-wheel motor, according to an embodiment of the present disclosure.

Referring to FIGS. 1 and 2, the steering shock absorbing structure for an in-wheel motor according to an embodiment of the present disclosure may include a steering input unit 200, a steering unit 300, a tilting unit 400, and a controller 500. In addition, the steering shock absorbing structure according to an embodiment of the present disclosure may further include an in-wheel motor unit 700 and an acceleration sensor 600.

A wheel 100 may be configured to be steered according to an operation of a steering wheel. The wheel 100 may be separated from a vehicle body and configured to be rotatable according to the operation of the steering wheel.

The steering input unit 200 may include the steering wheel and configured to detect a steering angle of the steering wheel. More preferably, in order to control driving of a vehicle in which the in-wheel motor unit 700 is mounted, the steering input unit 200 may be configured to detect the steering angle according to steering of the steering wheel performed by a driver. That is, a steering wheel steering angle sensor configured to detect the steering angle of the steering wheel may be mounted in the steering input unit 200. The steering angle, which is detected by the steering wheel steering angle sensor and input into the steering input unit 200, may be transmitted to the controller 500.

The steering input unit 200 of the present disclosure is a concept that includes not only a physical steering input but also electrical signals, so that the steering input unit 200 may include all configurations capable of receiving steering requests from a user or a controller.

The steering unit 300 may be fastened to a first end of the steering input unit 200. More preferably, the steering input unit 200 as the steering unit 300 may be configured to operate in conjunction with a suspension lower arm 301 and a knuckle 302. The steering unit 300 may be configured to steer the wheel 100 according to the steering angle of the steering input unit 200.

The tilting unit 400 may have a first end connected to the steering unit 300 and a second end connected to the wheel 100. The tilting unit 400 may be configured to be tilted with respect to the steering unit 300. The tilting unit 400 may be configured to be connected to the wheel 100, so that the wheel 100 may be tilted up and down with respect to a surface of the steering unit 300 when the tilting unit 400 is driven. In particular, the tilting unit 400 may be driven when an impact from a road surface is transferred to the wheel 100, so that the wheel 100 may be rotationally tilted in a direction opposite to a driving direction of the vehicle.

The controller 500 may be configured to transmit and receive signals with the steering input unit 200, the steering unit 300, the tilting unit 400, the in-wheel motor unit 700, and the acceleration sensor 600. The controller 500 may be configured to selectively drive the tilting unit 400. In particular, the controller 500 may selectively drive the tilting unit 400 according to a normal driving state or an impact applied state, so that driving stability may be realized and damage to the in-wheel motor unit 700 may be prevented.

In addition, depending on the steering angle of the steering wheel detected by the steering wheel steering angle sensor, the controller 500 may differently control a driving speed of each of the in-wheel motor unit 700 mounted in left and right wheels 100 (where reference number "100" corresponds to each of the wheels). That is, the in-wheel motor unit 700 may be controlled according to the steering angle that is input into the steering input unit 200.

Torque at the left and the right in-wheel motor units 700 are differently applied depending on signals from the controller 500, so that the left and the right in-wheel motor units 700 may be driven at different rotation speeds. Therefore, due to the different driving speed between the left and the right in-wheel motor units 700, a speed difference between the left and the right wheels 100 may occur. Due to the speed difference between the left and the right wheels 100, a steering angle at which the left and the right wheels 100 angularly rotate in the same one direction may be generated.

The in-wheel motor unit 700 may be configured to be connected to the tilting unit 400. More preferably, the in-wheel motor unit 700 may be positioned between the wheel 100 and the tilting unit 400. The in-wheel motor unit 700 may be configured to independently apply a drive force to each of the wheels 100. Each of the in-wheel motor unit 700 may be configured to move together with each of the wheels 100, respectively. Each of the in-wheel motor unit 700 may be positioned adjacent to the left and the right wheels 100, respectively, so that the in-wheel motor 700 may directly transfer a rotational drive force for the driving of the vehicle to each of the left and the right wheels 100. The in-wheel motor unit 700 may be configured to be controlled by the controller 500 according to the steering angle that is input into the steering input unit 200.

The acceleration sensor 600 may be configured to detect an impact value applied to the vehicle. More preferably, the tilting unit 400 may be configured to be selectively driven when the impact value that is equal to or higher than a preset impact value is applied to the acceleration sensor 600. As an embodiment of the present disclosure, the preset impact value may be 2.5 G. The preset impact value may vary depending the type of wheel and so on, and the preset impact value in the present disclosure is not particularly limited.

When the impact from the road surface is transferred to the wheel 100 of the vehicle, a suspension shock absorber connected to the knuckle 302 of the steering unit 300 may primarily absorb up and down impacts. When the tilting unit 400 is driven, the tilting unit 400 may be configured to secondarily absorb the up and down impacts and front and rear impacts.

More specifically, when the impact transferred to the wheel 100 during the driving of the vehicle is transferred through the knuckle 302, the up and down impacts may be absorbed by the suspension shock absorber. A tilting shock absorber 440 may absorb maintaining up and down impacts that is not absorbed by the suspension shock absorber, and the tilting shock absorber 440 may absorb the front and rear impacts.

Figure 3:
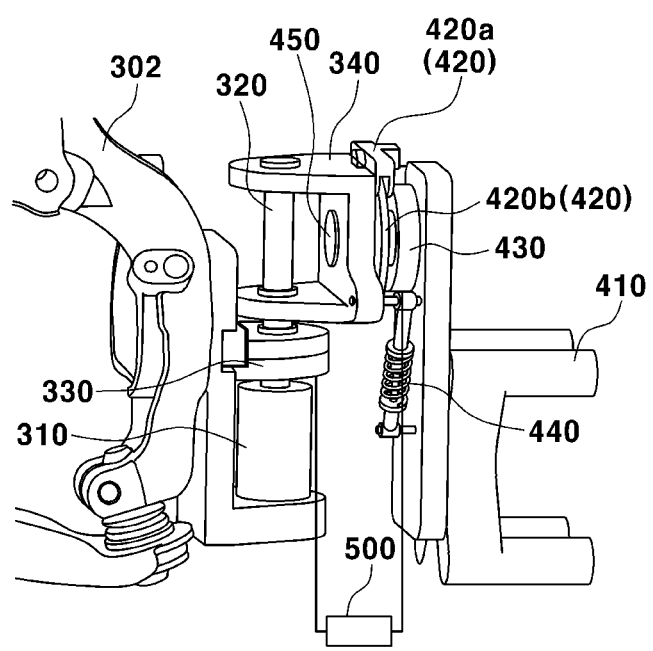
FIG. 3 is a view illustrating detailed configurations of a steering unit and a tilting unit of the steering shock absorbing structure for an in-wheel motor, according to an embodiment of the present disclosure.

FIG. 3 is a view illustrating detailed configurations of the steering unit 300 and the tilting unit 400 of the steering shock absorbing structure for an in-wheel motor, according to an embodiment of the present disclosure.

Referring to FIG. 3, the steering unit 300 may include a steering motor 310 and a steering angle sensor 330. In addition, the tilting unit 400 may include a tilting unit housing 410, a tilting brake disc 420A, a tilting brake caliper 420B, the tilting shock absorber 440, a tilting angle sensor 430, a tilting shaft 450, and the tilting yoke 340.

A tilting braking device 420 of the present disclosure may include all configurations capable of locking or unlocking the tilting unit housing 430 selectively. In an embodiment of the present disclosure, the tilting brake disc 420A and the tilting brake caliper 420B may be comprehensively referred to as the tilting braking device 420. Furthermore, the tilting braking device 420 hereinafter may be construed as respectively or comprehensively indicating the tilting brake disc 420A and the tilting brake caliper 420B.

The steering motor 310 may be connected to the steering input unit 200 and configured to rotate the tilting unit 400. More preferably, the steering motor 310 may be connected to a first end of the knuckle 302, and may be configured to rotate the tilting yoke 340 with respect to a steering shaft 320 in response to steering requests input through the steering input unit 200.

The steering motor 310 may be integrally formed with a motor and an engine control unit (ECU), such as a motor drive power steering (MDPS) power pack. In the ECU of the steering motor 310, the steering motor 310 may perform overall control of the steering by transmitting and receiving signals with the steering angle sensor 330 and the tilting brake caliper 420B.

When a driver turns the steering wheel, a steering request input is applied to the steering input unit 200, and the steering motor 310 may be configured to rotate the wheel 100 by calculating a rotation angle corresponding to the steering request input that is input into the steering input unit 200.

When a torque applied to the steering shaft 320 through the wheel 100 on a road surface exceeds the maximum torque of the steering motor 310, the rotation angle of the steering motor 310 may be configured to be not corresponding to the angle of the steering wheel that is operated by the driver.

The steering angle sensor 330 may be configured to be connected to the steering motor 310 with respect to the steering shaft 320. The steering angle sensor 330 may be configured to detect the rotation angle of the steering shaft 320. In addition, the steering angle sensor 330 may be configured to detect whether the steering request that is input into the steering input unit 200 and the rotation angle of the steering motor 310 match each other. The steering angle sensor 330 may be configured to monitor in real time whether the angle of the steering wheel that the driver turns and the rotation angle of the wheel 100 match each other.

The tilting yoke 340 may be configured to have an end fixed to the steering unit 300. More preferably, the tilting yoke 340 may be fixed to the steering input unit 200 by the steering shaft 320 penetrated through the tilting yoke 340. The tilting unit housing 410 may be positioned at a surface of the tilting yoke 340. More preferably, a tilting shaft 450 of the tilting unit housing 410 is fastened to a second surface of the tilting yoke 340, and the tilt unit housing 410 is configured to rotate up and down directions along on the first surface of the tilting yoke 340 with respect to the tilting shaft 450. The first surface of the tilting yoke 340 may further include a bearing at the first end facing the tilting shaft 450. The tilting unit housing 410 may be configured to rotate with respect to the tilting shaft 450 that is inserted into the tilting yoke 340. The steering angle sensor 330 and the steering motor 310 may be positioned at a lower surface of the tilting yoke 340 around the steering shaft 320. More preferably, the tilting shaft 450 may be positioned at the tilting unit housing 410, and the tilting shaft 450 is inserted into an opening portion of the tilting yoke 340, so that the tilting unit housing 410 is configured to be rotate around the tilting shaft 450 with respect to the surface of the tilting yoke 340.

The tilting unit housing 410 may be configured to be fixed to the wheel 100. More preferably, a lower end portion of the tilting unit housing 410 may be fixed to the in-wheel motor unit 700 that is mounted in the wheel 100, so that the tilting unit housing 410 may be configured to tilt the wheel 100. The tilting unit housing 410 may be configured to be rotationally tilted with respect to the tilting yoke 340. More preferably, the tilting unit housing 410 may rotate with respect to the tilting shaft 450 that is fastened to the tilting yoke 340.

As the tilting braking system 420, the tilting brake disc 420A and the tilting brake caliper 420B may be configured to resemble a mechanism of an electronic brake system (EBS) for braking a driving of a vehicle.

Furthermore, the tilting brake disc 420A may be configured to be fixed to the tilting unit housing 410. The tilting brake disc 420A may be configured to fix or rotate the tilting unit housing 410 by using a frictional force with the tilting brake caliper 420B.

In addition, the tilting brake caliper 420B may be fixed to the tilting yoke 340 and configured to be selectively in contact with the tilting brake disc 420A.

The tilting brake caliper 420B may be configured to be frictionally in contact with the tilting brake disc 420A by the signal from the controller 500 according to the impact from the road surface. Accordingly, the tilting brake disc 420A may be configured to be fixed or rotated with respect the tilting yoke 340 selectively.

The tilting brake caliper 420B may be configured to control a tilting angle and a tilting load by using the frictional force with the tilting brake disc 420A. The tilting brake caliper 420B may be configured to be in contact with the tilting brake disc 420A in the normal driving state, so that the tilting brake caliper 420B may be configured to prevent the tilting unit housing 410 from being tilted. Therefore, a driving stability and a driving performance may be secured.

When the impact from the road surface is detected by the acceleration sensor 600 and the steering angle sensor 330, a braking force of the tilting braking device 420 that is including the tilting brake caliper 420B and the tilting braking disc 420A is released, so that the tilting unit housing 410 may be configured to be rotated.

The tilting shock absorber 440 may be configured to have a first end connected to the tilting yoke 340 and a second end connected to the tilting unit housing 410. The tilting shock absorber 440 may be configured to absorb the impact from the road surface when the tilting unit housing 410 is tilted. More specifically, the tilting shock absorber 440 may be configured to be compressed by the tilting unit housing 410 being rotated when the impact from the road surface is applied, so that the tilting shock absorber 440 may be configured to absorb the impact by using a spring and a damper thereof.

The tilting angle sensor 430 may be configured to detect the tilting angle of the tilting unit housing 410 by being in conjunction with the tilting brake caliper 420B. In an embodiment of the present disclosure, when a tilting angle that is detected by the tilting angle sensor 430 is zero degrees, the tilting brake caliper 420B may be configured to fix the tilting brake disc 420A. In another embodiment of the present disclosure, when the tilting brake disc 420A is released from the tilting brake caliper 420B, the tilting angle sensor 430 may be configured to detect whether the tilting unit housing 410 is rotated away from a preset tilting limit angle.

Figure 4:
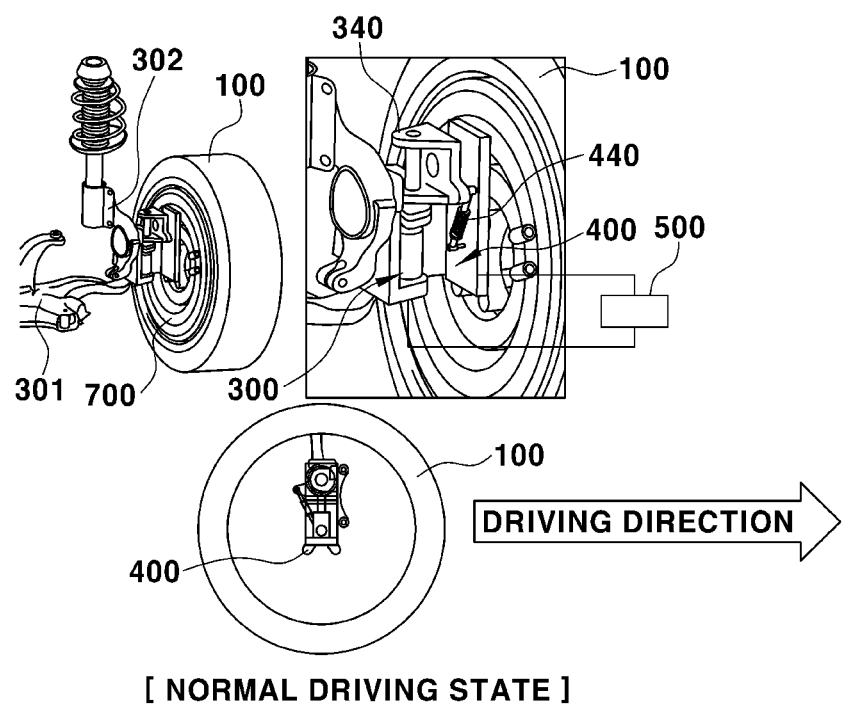
FIG. 4 is a view illustrating a driver controllable state of the steering shock absorbing structure for an in-wheel motor, according to an embodiment of the present disclosure.

FIG. 4 is a view illustrating a driver controllable state of the steering shock absorbing structure for an in-wheel motor, according to an embodiment of the present disclosure.

Referring to FIG. 4, when the vehicle is in the driver controllable state, the controller 500 may control the tilting brake disc 420A of the tilting braking device 420 to be fixed. The driver controllable state may indicate a state in which a torque from a road surface applied to the steering shaft 320 via the wheel 100 is within the maximum torque range of the steering motor 310 when the impact from the road surface is existing. In addition, under the normal driving state with no road impact, the controller 500 may be configured to control the tilting braking device 420 to fix the tilting brake disc 420A.

In the driver controllable state, the angle of the steering wheel operated by the driver and the rotation angle of the steering motor 310 may be configured to correspond to each other. In addition, in the driver controllable state, the steering angle input into the steering input unit 200 and the rotation angle of the steering motor 310 may be configured to match each other.

The impact transferred from the road surface in the driver controllable state, the up and down impacts may be absorbed by the suspension shock absorber being moved up and down directions. At this time, the tilting brake disc 420A as the tilting braking device 420 is fixed by the tilting brake caliper 420B, so that the tilting unit 400 may maintain the fixed state. In the driver controllable state, the tilting unit 400 is not tilted because the operation of the tilting brake disc 420A is limited, so that the operating stability of the driver may be secured.

The controller 500 compares the rotation angle of the steering motor 310 detected by the steering angle sensor 330 with the steering angle input into the steering input unit 200 detected by the steering wheel steering angle sensor, and configured to adjust the steering angle of the left and right wheels 100 to a steering angle suitable for the steering angle input into the steering input unit 200.

Figure 5:
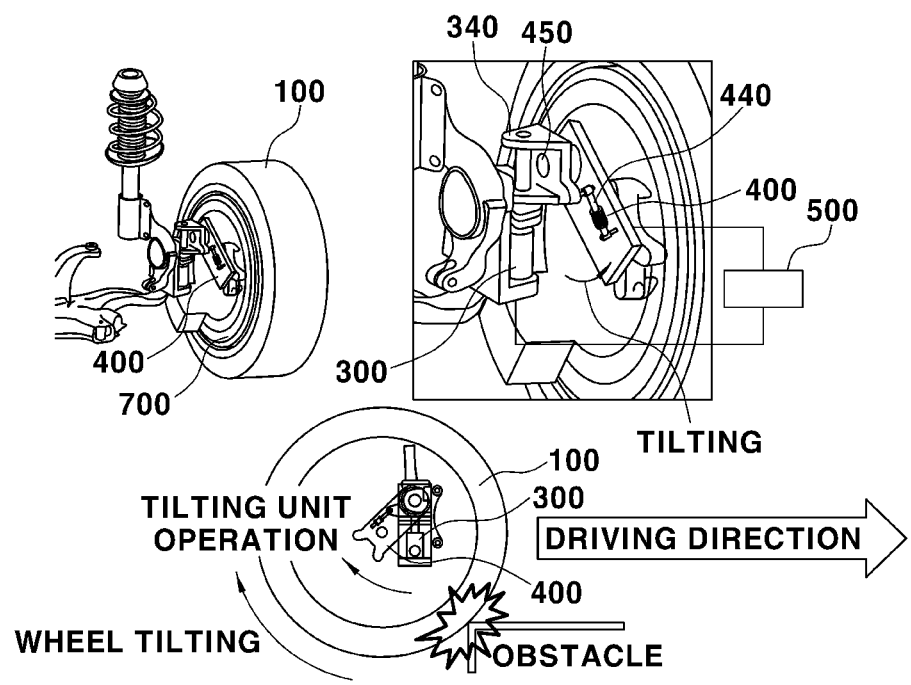
FIG. 5 is a view illustrating a driver non-controllable state of the steering shock absorbing structure for an in-wheel motor, according to an embodiment of the present disclosure.

FIG. 5 is a view illustrating a driver non-controllable state of the steering shock absorbing structure for an in-wheel motor, according to an embodiment of the present disclosure.

Referring to FIG. 5, when the vehicle is in the driver non-controllable state, the controller 500 may be configured to release the tilting brake disc 420A of the tilting braking device 420. The driver non-controllable state may indicate a state in which a torque from a road surface applied to the steering shaft 320 via the wheel 100 exceeds the maximum torque of the steering motor 310.

When an impact from a road surface is transferred to the vehicle, the acceleration sensor 600 may detect the impact value applied to the vehicle. When an impact value equal to or higher than a preset impact value is applied to the acceleration sensor 600, the steering angle sensor 330 may be configured to detect whether the steering angle input into the steering input unit 200 and the rotation angle of the steering motor 310 match each other.

When the vehicle is in the driver non-controllable state, the steering angle input into the steering input unit 200 and the rotation angle of the steering motor 310 may not match each other. When the vehicle is in the driver non-controllable state, the controller 500 may be configured to control the tilting braking device 420 such that the tilting brake disc 420A is released from the tilting brake caliper 420B, so that the tilting unit housing 410 may be rotated.

The tilting unit housing 410 may be tilted with respect to the tilting yoke 340 in response to the tilting signal from the controller 500. More preferably, when the tilting signal from the controller 500 is transmitted to the tilting brake caliper 420B, the tilting unit housing 410 as illustrated in FIG. 5 may be tilted in a clockwise direction with respect to the tilting shaft 450 that is positioned by being inserted into the tilting yoke 340.

The tilting shock absorber 440 may be configured to be compressed when the tilting unit housing 410 is tilted with respect to the tilting shaft 450 of the tilting yoke 340. In the driver non-controllable state, the suspension shock absorber may primarily absorb the up and down impacts. The tilting shock absorber 440 may be configured to the wheel 100 to be moved in a rear upper direction with respect to the tilting shaft 450 while the tilting shock absorber 440 further absorbs the impact that is not absorbed by the suspension shock absorber.

Since the suspension shock absorber absorbs the up and down impacts by being moved up and down, so that the front and rear impacts are not absorbed by the suspension shock absorber. However, the tilting unit 400 moves to the upper direction at the same time when the wheel 100 is moved to the rear direction, so that the impact is effectively absorbed by riding over an obstacle and an internal damage to the in-wheel motor unit 700 may be prevented.

When the impact is removed by the tilting shock absorber 440, the vehicle may escape from the driver non-controllable state. When the vehicle escapes from the driver non-controllable state, the tilting unit housing 410 may be returned to an original position thereof by using an elastic restoring force of the tilting shock absorber 440. More preferably, the tilting unit housing 410 may be returned to the original position thereof by being rotated counterclockwise direction with respect to FIG. 5.

When the tilting unit housing 410 is released from tilting 340 with respect to the tilting yoke 340, the tilting brake disc 420A may be configured to be fixed. More preferably, if the tilting angle detected by the tilting angle sensor 430 is zero degrees, the controller 500 may be configured to control the tilting brake disc 420A to be fixed.

Figure 6:
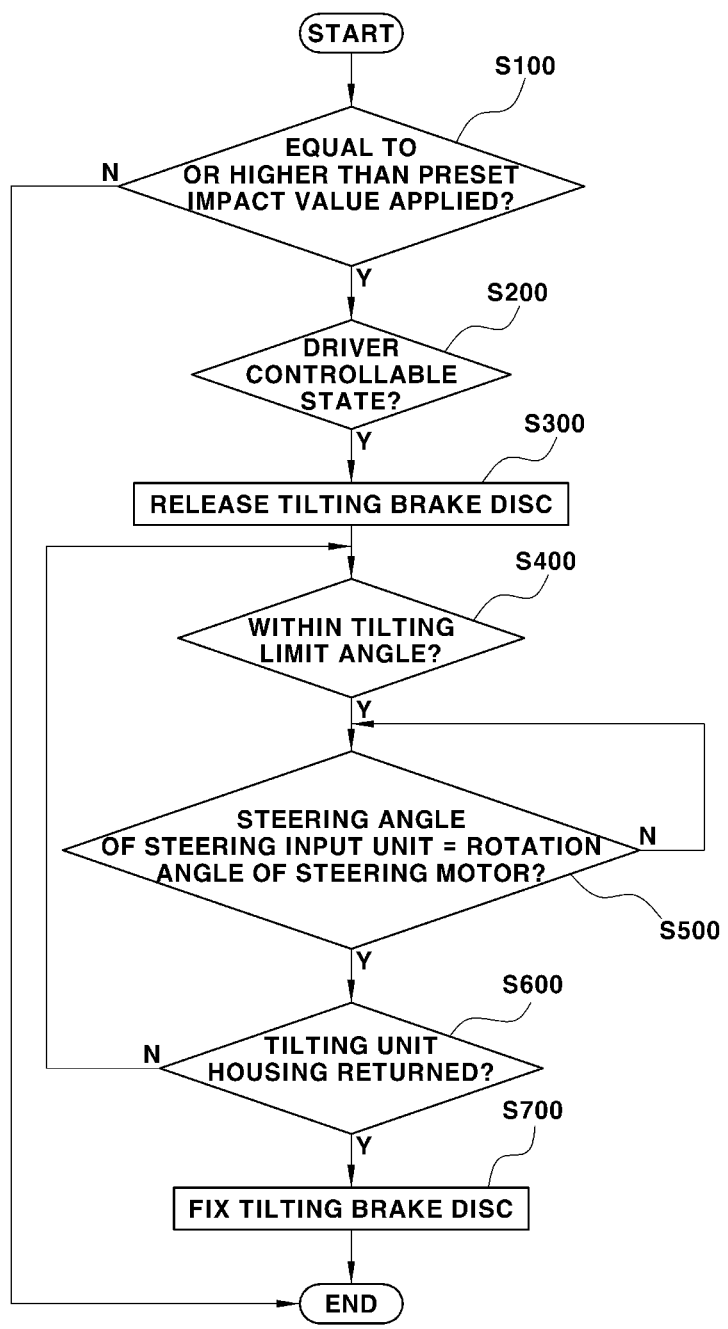
FIG. 6 is a flowchart illustrating a steering shock absorbing method for an in-wheel motor, according to an embodiment of the present disclosure.

FIG. 6 is a flowchart illustrating a steering shock absorbing method for an in-wheel motor, according to an embodiment of the present disclosure.

Referring to FIG. 6, the steering shock absorbing method for an in-wheel motor according to an embodiment of the present disclosure includes: detecting, by the acceleration sensor 600, whether the impact value equal to or higher than the preset impact value is applied to the acceleration sensor 600 (S100); when the impact value equal to or higher than the preset impact value is applied to the acceleration sensor 600 in the detecting step (S100), determining, by the controller 500, whether the vehicle is in the driver controllable state (S200); releasing the tilting brake disc 420A (S300); detecting, by the tilting angle sensor 430, whether the tilting unit housing 410 is tilted within the preset tilting limit angle (S400); in the detecting step, when the tilting unit housing 410 is tilted within the preset tilting limit angle, adjusting, by the controller 500, the steering angle input into the steering input unit 200 and the rotation angle of the steering motor 310 to match each other under a condition that the tilting braking device is released (S500); when the adjusting step (S500) is completed, detecting, by the tilting angle sensor 430, whether the tilting unit housing 410 is returned to an original position thereof (S600); and when the tilting angle sensor 430 detects that the tilting unit housing 410 is returned to the original position thereof (S600), fixing the tilting brake disc 420A (S700).

In the detecting step (S100), when the impact value equal to or higher than the preset impact value is applied to the acceleration sensor 600, the tilting unit 400 may be configured to be selectively driven. As an embodiment of the present disclosure, the preset impact value may be 2.5 G. When the impact value equal to or higher than 2.5 G is applied to the acceleration sensor 600, the controller 500 may determine whether the vehicle is in the driver controllable state (S200).

In the determining step (S200), the controller 500 may determine whether a torque applied from the road surface to the steering shaft 320 through the wheel 100 exceeds the maximum torque of the steering motor 310. When the torque applied from the road surface to the steering shaft 320 through the wheel 100 exceeds the maximum torque of the steering motor 310, the angle of the steering wheel that is controlled by the driver and the angle of the steering shaft 320 may not correspond to each other. At this time, the controller 500 may instantly calculate the magnitude of the impact from the road surface through the signals detected by the acceleration sensor 600, the steering angle sensor 330, and the steering wheel angle sensor. In the determining step (S200), when the controller 500 determines the vehicle is in the driver non-controllable state, the controller 500 may release the tilting brake disc 420A in the releasing step (S300).

In the releasing step (S300), when the tilting brake disc 420A is released, the tilting unit housing 410 may be tilted to a predetermined angle. In the detecting, by the tilting angle sensor 430, whether the tilting unit housing 410 is tilted within the preset tilting limit angle (S400), the tilting brake caliper 420B may maintain a state in which the tilting brake caliper 420B is not in contact with the tilting brake disc 420A.

Then, in the detecting, by the tilting angle sensor 430, whether the tilting unit housing 410 is tilted within the preset tilting limit angle (S400), when the tilted angle is within the limit tilting angle, adjusting, by the controller 500, the steering angle that is input into the steering input unit 200 and the rotation angle of the steering motor 310 to match each other (S500) may be included.

When the tilting brake disc 420A is released in the releasing step (S300), the adjusting step (S500) may be a process of adjusting the steering motor 310 according to the steering angle that is input into the steering input unit 200. The controller 500 may be configured to control to match the steering angle input into the steering input unit 200 and the rotation angle of the steering motor 310 by adjusting the rotation angle of the steering motor 310.

When the adjusting step (S500) is completed, detecting, by the tilting angle sensor 430, whether the tilting unit housing 410 is returned to an original position thereof (S600) may be provided. In the detecting step (S600), when the tilting angle of the tilting unit housing 410 is zero degrees, the tilting unit housing 410 may be detected as being returned to the original position thereof. When the tilting angle sensor 430 detects that the tilting unit housing 410 is returned to the original position thereof, fixing, by the controller 500, the tilting brake disc 420A (S700) may be performed.

When the tilting unit housing 410 is detected as being returned to the original position thereof in the detecting, by the tilting angle sensor 430, whether the tilting unit housing 410 is returned to an original position thereof (S600), the fixing, by the controller 500, the tilting brake disc 420A (S700) may be included.

In the fixing the tilting brake disc 420A (S700), the tilting brake disc 420A may be fixed by being in contact with the tilting brake caliper 420B. More preferably, when the controller 500 transmits a fixing signal to the tilting brake caliper 420B, the tilting brake caliper 420B may fix the tilting brake disc 420A by grabbing both sides of the tilting brake disc 420A.

Figure 7:
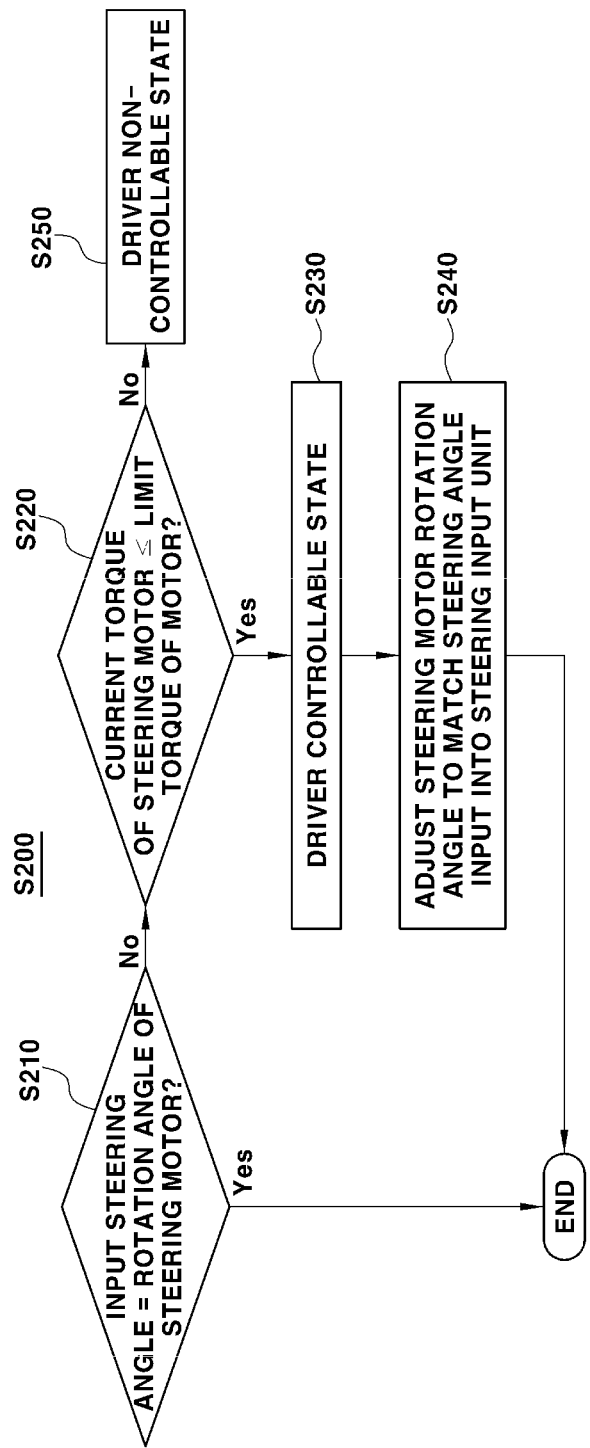
FIG. 7 is a flowchart illustrating a process when the steering shock absorbing method for an in-wheel motor is in the driver controllable state, according to an embodiment of the present disclosure.

FIG. 7 is a flowchart illustrating a process when the steering shock absorbing method for an in-wheel motor is in the driver controllable state, according to an embodiment of the present disclosure.

Referring to FIG. 7, in the determining step (S200), determining whether the steering angle that is input and the rotation angle of the steering motor 310 are the same (S210) is performed, and when the steering angle and the rotation angle are not the same, determining whether a torque that is currently applied from the steering motor 310 is equal to or less than a preset limit torque of the steering motor 310 (S220) is performed. In the determining step, it is determined that the vehicle is in the driver controllable state when the torque that is currently applied from the steering motor 310 is equal to or less than the preset limit torque of the steering motor 310 (S230), and it is determined that the vehicle is in the driver non-controllable state when the torque that is currently applied from the steering motor exceeds the preset limit torque of the steering motor (S250).

In the driver controllable state, adjusting, by the controller 500, the steering angle that is input into the steering input unit 200 and the rotation angle of the steering motor 310 to match each other may be further included.

When the impact value detected by the acceleration sensor 600 is equal to or higher than the preset impact value, the determining, by the controller 500, whether the vehicle is in the driver controllable state (S200) may be performed. The controller 500 determines that the vehicle is in the driver controllable state when the torque from the road surface applied to the steering shaft 320 through the wheel 100 is within the maximum torque range of the steering motor 310.

When the controller 500 determines that the vehicle is in the driver controllable state, the controller 500 may adjust (S240) the rotation angle of the steering motor 310. In particular, the controller 500 may control to match the steering angle input into the steering input unit 200 and the rotation angle of the steering motor 310. The controller 500 can maintain the steering angle that is intended by the driver when the vehicle is in the driver controllable state, such that the controller 500 may control the tilting unit 400 to be in the fixed state.

Figure 8:
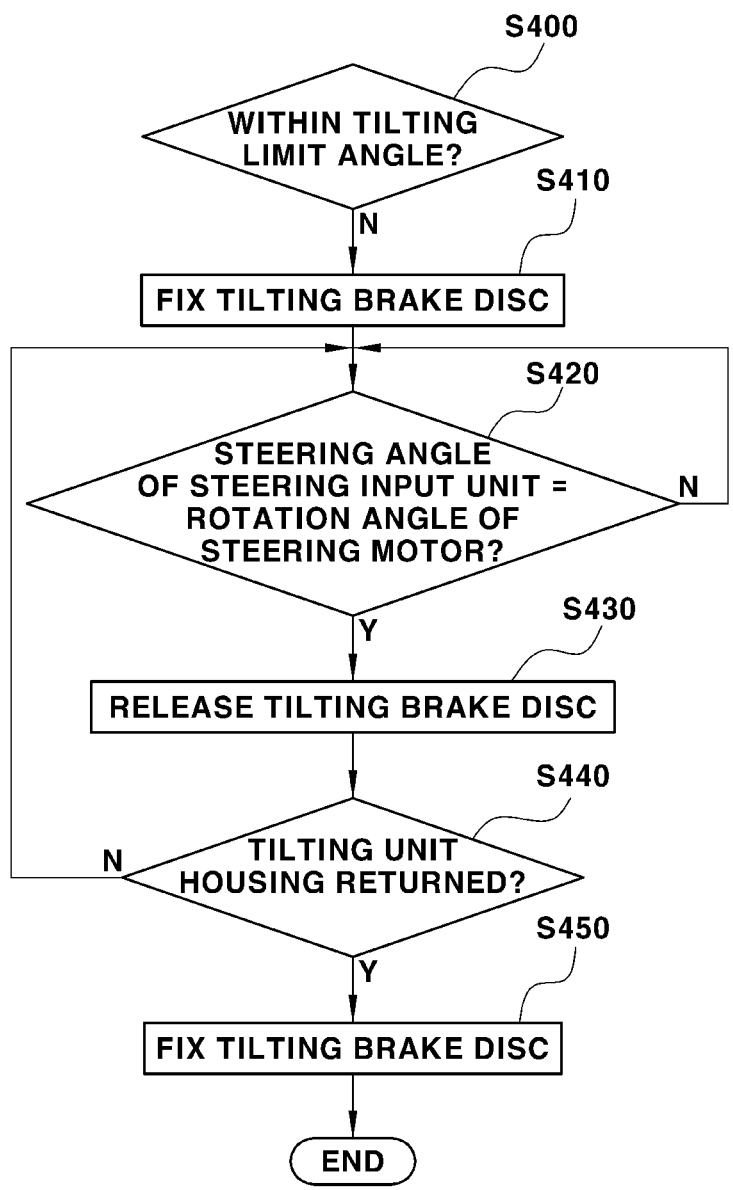
FIG. 8 is a flowchart illustrating a process when the steering shock absorbing method for an in-wheel motor is in a state in which a tilting angle is away from a tilting limit angle, according to an embodiment of the present disclosure.

FIG. 8 is a flowchart illustrating a process when the steering shock absorbing method for an in-wheel motor is in a state in which a tilting angle is away from a tilting limit angle, according to an embodiment of the present disclosure.

Referring to FIG. 8, in the detecting whether the tilting unit housing 410 is tilted within the preset tilting limit angle (S400) further comprises: when the tilting unit housing 410 is tilted away from the preset tilting limit angle, fixing the tilting braking disc 420A (S410); adjusting, by the controller 500, the steering angle that is input into the steering input unit 210 and the rotation angle of the steering motor 310 to match each other (S420); when the adjusting of the steering angle that is input into the steering input unit 200 and the rotation angle of the steering motor 310 to match each other (S420) is completed, releasing the tilting braking disc 420A (S430); detecting, by the tilting angle sensor 430, whether the tilting unit housing 410 is returned to the original position thereof (S440); and when the tilting unit housing 410 is returned to the original position thereof, fixing the tilting braking disc 420A (S450).

In the detecting whether the tilting unit housing 410 is tilted within the preset tilting limit angle (S400), when the tilting unit housing 410 is tilted away from the preset tilting limit angle, fixing the tilting braking disc 420A (S410) may be performed.

As an embodiment of the present disclosure, the preset tilting limit angle may be 45 degrees. The tilting angle sensor 430 may transmit a signal to the controller 500 when the tilting angle sensor 430 detects that the tilting unit housing 410 is tilted away from the preset tilting limit angle. In this case, the controller 500 may control the tilting brake caliper 420B to be in contact with the tilting brake disc 420A by transmitting a fixing signal to the tilting brake caliper 420B. That is, the tilting brake disc 420A may be fixed.

In a state when the tilting brake disc 420A is fixed, the tilting shock absorber 440 may absorb the impact transmitted from the road surface. The controller 500 may determine whether the torque applied to the steering shaft 320 is lowered within the maximum torque range of the steering motor 310.

In the state when the tilting brake disc 420A is fixed, the adjusting, by the controller 500, the steering angle that is input into the steering input unit 210 and the rotation angle of the steering motor 310 to match each other (S420) may be performed. Then, when the adjusting is completed, the controller 500 may perform the releasing the tilting braking disc 420A from the fixed state (S430). The tilting angle sensor 430 may perform the detecting, whether the tilting unit housing 410 is returned to the original position thereof (S440). For example, when the tilting angle detected by the tilting angle sensor 450 is zero degrees, the tilting angle sensor 4410 may determine that the tilting unit housing 410 is returned to the original position thereof. When the tilting unit housing 410 is determined that the tilting unit housing 410 is returned to the original position thereof, the controller 500 may perform the fixing of the tilting braking disc 420A (S450).

To put it briefly, the present disclosure provides a steering shock absorbing structure for an in-wheel motor, the structure capable of minimizing damage to an in-wheel motor by applying the separate tilting unit 400 that secondarily absorbs a shock that is equal to or higher than a preset threshold. In addition, the present disclosure provides a steering shock absorbing method for an in-wheel motor, the method capable of selectively driving the tilting unit 400 by calculating an amount of impact detected by a plurality of sensors.

The foregoing detailed description illustrates the present disclosure. Further, the foregoing is intended to illustrate and describe the exemplary embodiments of the present disclosure, and the present disclosure may be used in various other combinations, modifications, and environments. That is, it is possible to make alternations or modifications without departing from the scope of the present disclosure disclosed in the present specification, equivalents, and/or within the technical or knowledge scope in the art to which the present disclosure pertains. The described embodiments are intended to illustrate the best mode for carrying out the technical spirit of the present disclosure and various modification can made in the specific applications and uses of the present disclosure. Therefore, the detailed description is not intended to limit the present disclosure as in the disclosed embodiments. Further, it should be construed that the appended claims are intended to include another embodiment

What is claimed is:

1. A steering shock absorbing structure for an in-wheel motor, the structure comprising:
    a steering input unit configured to detect a steering angle of a steering wheel;
    a steering unit fastened to the steering input unit, and configured to steer a wheel according to the steering angle of the steering input unit;
    a tilting unit having a first end connected to the steering unit and a second end connected to the wheel, and configured to be tilted with respect to the steering unit; and
    a controller configured to selectively drive the tilting unit
    wherein the tilting unit configured to be tilted in front or rear direction to a driving direction of the vehicle.

2. The structure of claim 1, wherein the steering unit comprises:
    a steering motor connected to the steering input unit and configured to rotate the tilting unit; and
    a steering angle sensor connected to the steering motor with respect to a steering shaft, and configured to detect whether the steering angle that is input into the steering input unit and a rotation angle of the steering motor match each other.

3. The structure of claim 1, wherein the tilting unit comprises:
    a tilting yoke having an end fastened to the steering unit;
    a tilting unit housing fixed to the wheel, and configured to be rotationally tilted with respect to a tilting shaft positioned at a surface of the tilting yoke;
    a tilting braking device positioned between the tilting unit housing and the tilting yoke, and configured to selectively fix the tilting unit housing;
    a tilting shock absorber having a first end connected to the tilting yoke and a second end connected to the tilting unit housing; and
    a tilting angle sensor operably connected with the tilting braking device, and configured to detect a tilting angle of the tilting unit housing.

4. The structure of claim 3, further comprising an acceleration sensor configured to detect an impact value of a vehicle, wherein when the impact value that is equal to or higher than a preset impact value is applied to the acceleration sensor, a steering angle sensor detects whether the steering angle that is input into the steering input unit and a rotation angle of a steering motor match each other.

5. The structure of claim 4, wherein when the vehicle is in a driver controllable state, the controller controls the tilting braking device to fix the tilting unit housing.

6. The structure of claim 4, wherein when the vehicle is in a driver non-controllable state, the controller controls the tilting braking device to release the tilting unit housing.

7. The structure of claim 6, wherein the tilting unit housing is configured to be tilted with respect to the tilting yoke, and the tilting shock absorber is configured to be compressed.

8. The structure of claim 7, wherein when the vehicle escapes from the driver non-controllable state, the tilting unit housing is returned to an original position thereof by an elastic restoring force of the tilting shock absorber.

9. The structure of claim 8, wherein the tilting unit housing is configured to be released from tilting, and the tilting braking device is configured to be fixed.

10. The structure of claim 1, further comprising an in-wheel motor unit connected to the tilting unit and configured to independently apply a driving force to the wheel.

11. A steering shock absorbing method for an in-wheel motor, the method comprising the steps of:
    detecting, by an acceleration sensor, whether an impact value that is equal to or higher than a preset impact value is applied to the acceleration sensor;
    when the impact value that is equal to or higher than the preset value is applied to the acceleration sensor, determining, by a controller, whether a vehicle is in a driver controllable state;
    in the determining step, when the controller determines the vehicle is in a driver non-controllable state, releasing a tilting braking device;
    detecting, by a tilting angle sensor, whether a tilting unit housing is tilted within a preset tilting limit angle;
    when the tilting unit housing is tilted within the preset tilting limit angle, adjusting, by the controller, a steering angle that is input into a steering input unit and a rotation angle of a steering motor to match each other under a condition that the tilting braking device is released;
    when the adjusting step is completed, detecting, by the tilting angle sensor, whether the tilting unit housing is returned to an original position thereof; and
    when the tilting angle sensor detects that the tilting unit housing is restored to the original position thereof, fixing the tilting braking device.

12. The method of claim 11, wherein the determining step further comprises:
    determining whether the steering angle that is input and the rotation angle of the steering motor are the same;
    when the steering angle and the rotation angle are not the same, determining whether a torque that is currently applied from the steering motor is equal to or less than a preset limit torque of the steering motor; and
    determining that the vehicle is in the driver controllable state when the torque that is currently applied from the steering motor is equal to or less than the preset limit torque of the steering motor, and determining that the vehicle is in the driver non-controllable state when the torque that is currently applied from the steering motor exceeds the preset limit torque of the steering motor.

13. The method of claim 12, wherein the determining step further comprises:
    adjusting, by the controller, the steering angle that is input into the steering input unit and the rotation angle of the steering motor to match each other.

14. The method of claim 11, wherein the detecting step further comprises:
    when the tilting unit housing is tilted away from the preset tilting limit angle, fixing the tilting braking device;

adjusting, by the controller, the steering angle that is input into the steering input unit and the rotation angle of the steering motor to match each other;

when the adjusting step is completed, releasing the tilting braking device;

detecting, by the tilting angle sensor, whether the tilting unit housing is returned to the original position thereof; and when the tilting unit housing is returned to the original position thereof, fixing the tilting braking device.

* * * * *